United States Patent
Sun et al.

(10) Patent No.: US 11,445,448 B2
(45) Date of Patent: Sep. 13, 2022

(54) POWER CONTROL METHOD FOR PHYSICAL RANDOM ACCESS CHANNEL AND TERMINAL

(71) Applicant: VIVO MOBILE COMMUNICATION CO., LTD., Chang'an Dongguan (CN)

(72) Inventors: Xiaodong Sun, Chang'an Dongguan (CN); Peng Sun, Chang'an Dongguan (CN); Xueming Pan, Chang'an Dongguan (CN); Yu Yang, Chang'an Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 0 days.

(21) Appl. No.: 17/153,442

(22) Filed: Jan. 20, 2021

(65) Prior Publication Data

US 2021/0144651 A1  May 13, 2021

Related U.S. Application Data

(63) Continuation of application No. PCT/CN2019/096131, filed on Jul. 16, 2019.

(30) Foreign Application Priority Data

Jul. 20, 2018 (CN) .......................... 201810804585.0

(51) Int. Cl.
| | |
|---|---|
| *H04W 52/04* | (2009.01) |
| *H04W 52/24* | (2009.01) |
| *H04L 5/00* | (2006.01) |
| *H04W 74/08* | (2009.01) |

(52) U.S. Cl.
CPC ......... *H04W 52/242* (2013.01); *H04L 5/0057* (2013.01); *H04W 74/0833* (2013.01)

(58) Field of Classification Search
CPC ..... H04W 76/10; H04W 74/04; H04W 48/12; H04W 52/04; H04W 52/08; H04W 52/18; H04W 52/32; H04L 1/06; H04B 17/318
See application file for complete search history.

(56) References Cited

U.S. PATENT DOCUMENTS

| | | |
|---|---|---|
| 2013/0058315 A1 | 3/2013 | Feuersanger et al. |
| 2014/0113677 A1 | 4/2014 | Parkvall et al. |
| 2014/0247796 A1 | 9/2014 | Ouchi et al. |

(Continued)

FOREIGN PATENT DOCUMENTS

| | | |
|---|---|---|
| CN | 102918896 A | 2/2013 |
| CN | 103067966 A | 4/2013 |

(Continued)

OTHER PUBLICATIONS

Extended European Search Report for related Application No. 19837378.9; reported on Jul. 22, 2021.

(Continued)

*Primary Examiner* — Tu X Nguyen
(74) *Attorney, Agent, or Firm* — von Briesen & Roper, s.c.

(57) ABSTRACT

This disclosure provides a power control method for a physical random access channel and a terminal. The method includes: calculating a path loss of a physical random access channel PRACH based on power information related to a synchronization broadcast signal block; and calculating transmit power of the PRACH based on the path loss.

18 Claims, 3 Drawing Sheets

(56) References Cited

U.S. PATENT DOCUMENTS

| | | | |
|---|---|---|---|
| 2015/0117307 A1 | 4/2015 | Yang et al. | |
| 2015/0365157 A1 | 12/2015 | Yang et al. | |
| 2016/0150486 A1* | 5/2016 | Park | H04W 52/34 |
| | | | 455/422.1 |
| 2018/0115363 A1 | 4/2018 | Abedini et al. | |
| 2019/0313345 A1* | 10/2019 | Jiang | H04W 76/27 |

FOREIGN PATENT DOCUMENTS

| | | |
|---|---|---|
| CN | 104184548 A | 12/2014 |
| CN | 104969485 A | 10/2015 |
| JP | 2013085233 A | 5/2013 |
| JP | 2014529205 A | 10/2014 |
| JP | 2020529790 A | 10/2020 |
| KR | 101563469 B1 | 10/2015 |
| WO | 2018049274 A1 | 3/2018 |
| WO | 2019028881 A1 | 2/2019 |

OTHER PUBLICATIONS

Lenovo, Motorola Mobility, "Discussion of beam recovery procedure", Jun. 27-30, 2017, 3GPP TSG RAN WG1 NR Ad-Hoc#2, Qingdao, P.R. China.
Huawei, Hisilicon, "Correction to 38.300 to add a RA event triggered by SR", Jul. 2-6, 2018, 3GPP TSG-RAN WG2 Meeting #AH1807, Montreal, Canada.
International Search Report & Written Opinion related to Application No. PCT/CN2019/096131; reported on Feb. 4, 2021.
Chinese Office Action for related Application No. 201810804585.0; reported on Jun. 1, 2020.
3rd Generation Partnership Projec;, "Technical Specification Group Radio Access Network; NR; Physical Tayer procedures for control", Jun. 2018, 3GPP TS 38.213 V15.2.0, Valbonne, France.
First Japanese Office Action related to Application No. 2021-500989; reported on Feb. 25, 2022.
R1-1712066—Agenda Item: 6.1.1.4.3, Source: ZTE "Power control during random access procedure", Document for: Discussion and decision, 3GPP TSG RAN WG1 Meeting #90, Prague, Czechia, Aug. 21-25, 2017.

* cited by examiner

POWER CONTROL METHOD FOR PHYSICAL RANDOM ACCESS CHANNEL AND TERMINAL

CROSS-REFERENCE TO RELATED APPLICATIONS

The present application is a continuation application of International Application No. PCT/CN2019/096131 filed on Jul. 16, 2019, which claims priority of Chinese Patent Application No. 201810804585.0, filed in China on Jul. 20, 2018, both of which are incorporated herein by reference in their entireties.

TECHNICAL FIELD

This disclosure relates to the field of communications technologies, and in particular, to a power control method for a physical random access channel and a terminal.

BACKGROUND

In a 5th Generation ($5^{th}$ Generation, 5G) mobile communications system, which is also referred to as a new radio (New Radio, NR) system, supported operating frequency bands have been increased to above 6 GHz, and a highest operating frequency is approximately 100 GHz. A high frequency band includes plenty of free frequency resources, and may provide a higher throughput for data transmission. To achieve a downlink transmission rate of 20 Gbps and an uplink transmission rate of 10 Gbps, a high frequency band and a massive multiple input multiple output (Multiple Input Multiple Output, MIMO) technology with more antenna ports are introduced. A wavelength of a high frequency signal is short. In comparison with a low frequency band, more antenna array elements can be arranged on a panel of a same size, and a narrower beam with higher directivity is formed by using a beamforming technology. The massive (Massive) MIMO technology, by using a massive antenna array, can greatly enhance utilization efficiency of a system frequency band, and support a larger quantity of access users.

In a high frequency band communications system, because a wavelength of a radio signal is short, signal transmission is likely to be blocked, resulting in interruption of signal transmission. If radio link reestablishment in the related art is used, more time is consumed. Therefore, a link recovery mechanism such as a beam failure recovery (Beam Failure Recovery, BFR) mechanism is introduced. After a beam failure occurs, a terminal sends a beam failure recovery request to a network device side, where a higher layer of the terminal determines, based on candidate beams for the BFR, a physical random access channel (Physical Random Access Channel, PRACH) resource for sending the beam failure recovery request. In addition to the resource used for beam failure recovery, PRACH resources of the system further include resources used for other procedures. Power of a PRACH may be determined based on parameters such as maximum transmit power, target received power, and a path loss of the terminal, where the path loss is determined by transmit power of a reference signal. However, when transmit power of some reference signals cannot be determined, the terminal cannot calculate the path loss of the PRACH. Consequently, transmit power of the PRACH cannot be determined.

SUMMARY

Some embodiments of this disclosure provide a power control method for a physical random access channel and a terminal, to resolve a problem that a terminal cannot calculate transmit power of a PRACH when transmit power of some reference signals cannot be determined.

According to a first aspect, some embodiments of this disclosure provide a power control method for a physical random access channel, where the method is applied to a terminal and includes:

calculating a path loss of a physical random access channel PRACH based on power information related to a synchronization broadcast signal block; and calculating transmit power of the PRACH based on the path loss.

According to a second aspect, some embodiments of this disclosure further provide a terminal, including:

a first calculation module, configured to calculate a path loss of a physical random access channel PRACH based on power information related to a synchronization broadcast signal block; and a second calculation module, configured to calculate transmit power of the PRACH based on the path loss.

According to a third aspect, some embodiments of this disclosure provide a terminal, where the terminal includes a processor, a memory, and a computer program stored in the memory and capable of running on the processor, and when the computer program is executed by the processor, steps of the foregoing power control method for a physical random access channel are implemented.

According to a fourth aspect, some embodiments of this disclosure provide a computer-readable storage medium, where the computer-readable storage medium stores a computer program, and when the computer program is executed by a processor, steps of the foregoing power control method for a physical random access channel are implemented.

Therefore, the terminal in some embodiments of this disclosure can calculate the path loss in different scenarios by using the foregoing technical solutions, and accurately calculate the transmit power of the PRACH. This can ensure normal transmission of the PRACH and improve transmission performance.

BRIEF DESCRIPTION OF DRAWINGS

To describe the technical solutions in some embodiments of this disclosure more clearly, the following briefly describes the accompanying drawings required for describing some embodiments of this disclosure. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

Figure 1:
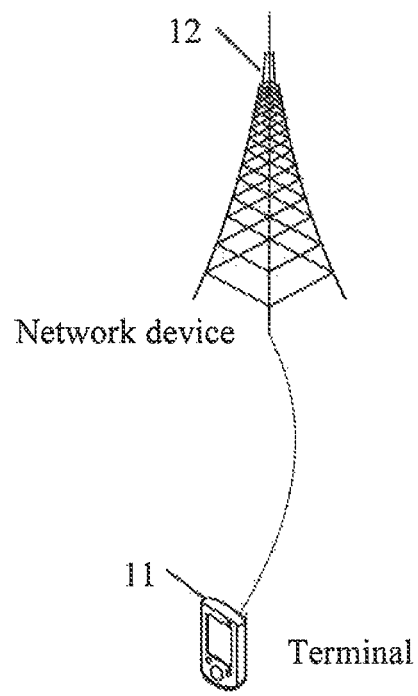
FIG. 1 presents a block diagram of a wireless communications system to which some embodiments of this disclosure may be applied.

The following describes exemplary embodiments of this disclosure in more detail with reference to the accompanying drawings. Although the exemplary embodiments of this disclosure are shown in the accompanying drawings, it should be understood that this disclosure may be implemented in various forms and should not be limited by the embodiments set forth herein. On the contrary, the embodiments are provided to enable a more thorough understanding of this disclosure and completely convey the scope of this disclosure to a person skilled in the art.

The terms "first", "second", and the like in this specification and claims of this application are used to distinguish between similar objects instead of describing a specific order or sequence. It should be understood that the numbers used in this way is interchangeable in appropriate circumstances so that the embodiments of this application described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, system, product, or device. The term "and/or" in this specification and claims indicates at least one of connected objects.

Technologies described in this specification are not limited to a long term evolution (Long Term Evolution, LTE) or LTE-Advanced (LTE-Advanced, LTE-A) system, and may also be applied to various wireless communications systems, for example, code division multiple access (Code Division Multiple Access, CDMA), time division multiple access (Time Division Multiple Access, TDMA), frequency division multiple access (Frequency Division Multiple Access, FDMA), orthogonal frequency division multiple access (Orthogonal Frequency Division Multiple Access, OFDMA), and single-carrier frequency-division multiple access (Single-carrier Frequency-Division Multiple Access, SC-FDMA). The terms "system" and "network" are usually used interchangeably. The technologies described in this specification may be used for the foregoing systems and radio technologies, and may also be used for other systems and radio technologies. However, in the following descriptions, an NR system is described for an illustration purpose, and NR terms are used in most of the following descriptions, although these technologies may have other applications than the application in the NR system.

Examples provided in the following description are not intended to limit the scope, applicability, or configuration described in the claims. Functions and arrangements of discussed elements may be changed without departing from the spirit and scope of this disclosure. Various examples may be omitted or replaced properly, or various procedures or components may be added. For example, the described method may be performed in an order different from the described order, and steps may be added, omitted, or combined. In addition, features described with reference to some examples may be combined in other examples.

FIG. 1 is a block diagram of a wireless communications system to which some embodiments of this disclosure may be applied. The wireless communications system includes a terminal 11 and a network device 12. The terminal 11 may also be referred to as a terminal device or user equipment (User Equipment, UE). The terminal 11 may be a terminal-side device such as a mobile phone, a tablet computer (Tablet Computer), a laptop computer (Laptop Computer), a personal digital assistant (Personal Digital Assistant, PDA), a mobile Internet device (Mobile Internet Device, MID), a wearable device (Wearable Device), or a vehicle-mounted device. It should be noted that a specific type of the terminal 11 is not limited in some embodiments of this disclosure. The network device 12 may be a base station or a core network. The base station may be a 5G base station or a base station of a later release (for example, a gNB or a 5G NR NB), or a base station in another communications system (for example, an eNB, a WLAN access point, or another access point). The base station may be referred to as a NodeB, an evolved NodeB, an access point, a base transceiver station (Base Transceiver Station, BTS), a radio base station, a radio transceiver, a basic service set (Basic Service Set, BSS), an extended service set (Extended Service Set, ESS), a NodeB, an evolved NodeB (eNB), a home NodeB, a home evolved NodeB, a WLAN access point, a Wi-Fi node, or another appropriate term in the art. As long as a same technical effect is achieved, the base station is not limited to a specific technical term. It should be noted that only a base station in an NR system is used as an example in some embodiments of this disclosure, but a specific type of the base station is not limited.

Under control of a base station controller, the base station may communicate with the terminal 11. In various examples, the base station controller may be a part of the core network or some base stations. Some base stations may communicate control information or user data with the core network by using backhauls. In some examples, some of these base stations may communicate with each other directly or indirectly by using backhaul links. The backhaul links may be wired or wireless communications links. The wireless communications system may support operations on multiple carriers (wave signals of different frequencies). A multi-carrier transmitter can transmit modulated signals on the multiple carriers simultaneously. For example, multi-carrier signals modulated by using various radio technologies may be transmitted on each communications link. Each modulated signal may be sent on different carriers and may carry control information (for example, a reference signal or a control channel), overhead information, data, and the like.

The base station may perform wireless communication with the terminal 11 by using one or more access point antennas. Each base station may provide communication coverage for a corresponding coverage area of the base station. A coverage area of an access point may be divided into sectors forming only a part of the coverage area. The wireless communications system may include different types of base stations (for example, a macro base station, a micro base station, or a picocell base station). The base station may also use different radio technologies, for example, a cell or WLAN radio access technology. The base station may be associated with a same or different access networks or operator deployments. Coverage areas of different base stations (including coverage areas of base stations of a same type or different types, coverage areas using a same radio technology or different radio technologies, or coverage areas of a same access network or different access networks) may overlap each other.

A communications link in the wireless communications system may include an uplink for carrying uplink (Uplink, UL) transmission (for example, from the terminal 11 to the network device 12) or a downlink for carrying downlink (Downlink, DL) transmission (for example, from the network device 12 to the terminal 11). UL transmission may also be referred to as reverse link transmission, and DL transmission may also be referred to as forward link transmission.

Figure 2:
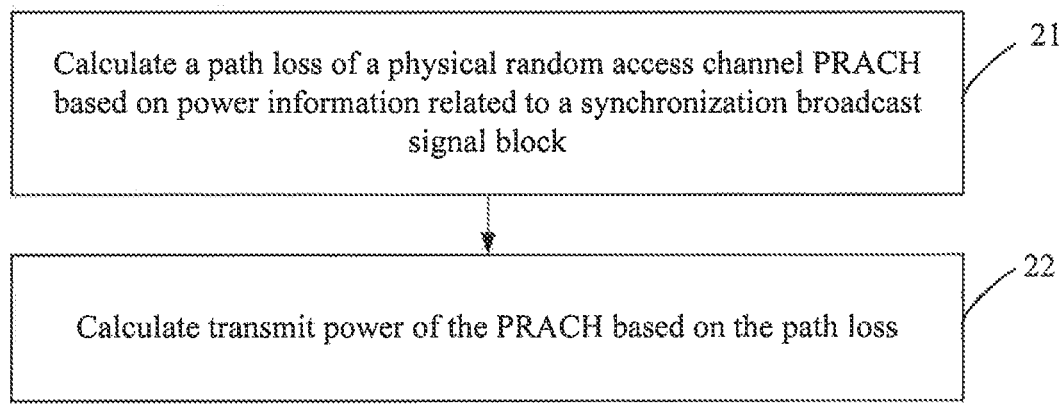
FIG. 2 presents a schematic flowchart of a power control method for a PRACH according to some embodiments of this disclosure.

Some embodiments of this disclosure provide a power control method for a physical random access channel, where the method is applied to a terminal. As shown in FIG. 2, the method includes the following steps.

Step 21: Calculate a path loss of a physical random access channel PRACH based on power information related to a synchronization broadcast signal block.

The synchronization broadcast signal block is broadcast by a network device. The synchronization broadcast signal block includes at least one of a synchronization signal (Synchronization Signal, SS) and a physical broadcast channel (Physical Broadcast Channel, PBCH). The synchronization signal includes at least one of a primary synchronization signal (Primary Synchronization Signal, PSS) and a secondary synchronization signal (Secondary Synchronization Signal, SSS). When the synchronization broadcast signal block includes the synchronization signal and the physical broadcast channel, the synchronization broadcast signal block may also be referred to as a synchronization signal and physical broadcast channel block (Synchronization Signal and PBCH Block, SS/PBCH block).

Further, the power information herein includes transmit power related to the synchronization broadcast signal block, and reference signal received power (Reference Signal Received Power, RSRP) related to the synchronization broadcast signal block. A path loss of a signal or channel is a difference between transmit power and actual received power. Step 21 may be: calculating the path loss of the PRACH based on the transmit power related to the synchronization broadcast signal block and the RSRP related to the synchronization broadcast signal block. Because the synchronization broadcast signal block is broadcast by the network device, whichever scenario the terminal is in, the terminal may receive the power information related to the synchronization broadcast signal block. Therefore, using the manner of step 21 to calculate the path loss is applicable to various scenarios.

Step 22: Calculate transmit power of the PRACH based on the path loss.

The transmit power (transmit power) of the PRACH is calculated based on maximum transmit power of the terminal, target received power of the PRACH, and the path loss. Optionally, a formula of power control for the PRACH may be implemented by referring to the following:

$$P_{PRACH,b,f,c}(i) = \min\{P_{CMAX,f,c}(i), P_{PRACH,target,f,c} + PL_{b,f,c}\}[dBm],$$

where $P_{PRACH,b,f,c}(i)$ indicates the transmit power of the PRACH; b indicates an uplink bandwidth part; f indicates a carrier center frequency; c indicates a serving cell; i indicates transmission time; $P_{CMAX,f,c}(i)$ indicates the maximum transmit power of the terminal; $P_{PRACH,target,f,c}$ indicates the target received power of the PRACH, which is configured by the network device (for example, indicated by a higher layer); and $PL_{b,f,c}$ indicates the path loss obtained by the terminal through calculation.

The PRACH may be contention-based or may be non-contention based. If the PRACH is non-contention based, step 21 may be implemented, without limitation, in the following two manners:

Manner 1: Calculate the path loss of the PRACH based on transmit power of the synchronization broadcast signal block, where the transmit power of the synchronization broadcast signal block is configured by the network device.

In this manner, a difference between the transmit power of the synchronization broadcast signal block and higher layer filtered reference signal received power is determined as the path loss, where the reference signal received power is actual received power of the synchronization broadcast signal block. Assuming that the synchronization broadcast signal block is an SS/PBCH block, for a specific implementation of the manner 1, refer to the following formula:

$$P_{RS} = P_{SS/PBCH\ block}, \text{ and}$$

$$PL = P_{RS} - \text{higher layer filtered RSRP},$$

where $P_{RS}$ indicates transmit power of a reference signal; $P_{SS/PBCH\ block}$ indicates transmit power of the SS/PBCH block (configured by the network device for the terminal by using the higher layer); PL indicates the path loss of the PRACH; and higher layer filtered RSRP indicates the higher layer filtered reference signal received power, where the reference signal received power indicates the actual received power of the synchronization broadcast signal block.

Manner 2: Calculate the path loss of the PRACH based on transmit power of the synchronization broadcast signal block and a power offset between a channel state information reference signal (Channel State Information Reference Signal, CSI-RS) and the synchronization broadcast signal block, where the power offset is configured by the network device.

In this manner, a sum of the transmit power of the synchronization broadcast signal block and the power offset, or a difference between the transmit power of the synchronization broadcast signal block and the power offset is determined as reference signal transmit power; and a difference between the reference signal transmit power and higher layer filtered reference signal received power is determined as the path loss. The reference signal received power is actual received power of a reference signal (such as a CSI-RS) related to the synchronization broadcast signal block. Assuming that the synchronization broadcast signal block is an SS/PBCH block, for a specific implementation of the manner 2, refer to the following formula:

$$P_{RS} = P_{SS/PBCH\ block} + \text{powerControlOffsetSS, and}$$

$$PL = P_{RS} - \text{higher layer filtered RSRP},$$

where $P_{RS}$ indicates transmit power of a reference signal; $P_{SS/PBCH\ block}$ indicates transmit power of the SS/PBCH block (configured by the network device for the terminal by using the higher layer); powerControlOffsetSS indicates a power offset between the CSI-RS and the SS/PBCH block; PL indicates the path loss of the PRACH; and higher layer filtered RSRP indicates the higher layer filtered reference signal received power, where the reference signal received power indicates the actual received power of the synchronization broadcast signal block.

Alternatively, the manner 2 is implemented by referring to the following formula:

$$P_{RS} = P_{SS/PBCH\ block} - \text{powerControlOffsetSS, and}$$

$$PL = P_{RS} - \text{higher layer filtered RSRP},$$

where $P_{RS}$ indicates transmit power of a reference signal; $P_{SS/PBCH\ block}$ indicates transmit power of the SS/PBCH block (configured by the network device for the terminal by using the higher layer); powerControlOffsetSS indicates a power offset between the CSI-RS and the SS/PBCH block; PL indicates the path loss of the PRACH; and higher layer filtered RSRP indicates the higher layer filtered reference signal received power, where the reference signal received power indicates the actual received power of the synchronization broadcast signal block.

If the PRACH is contention-based, step 21 may be implemented, without limitation, in the manner 1, that is, the path loss of the PRACH is calculated based on transmit power of the synchronization broadcast signal block, where the transmit power of the synchronization broadcast signal block is configured by the network device. For a specific implementation of this manner, refer to the foregoing non-contention scenario. Details are not described again herein.

The foregoing describes a general implementation of the power control method for a physical random access channel in some embodiments of this disclosure. The following further describes the method in different scenarios in some embodiments of this disclosure.

Scenario 1

Figure 3:
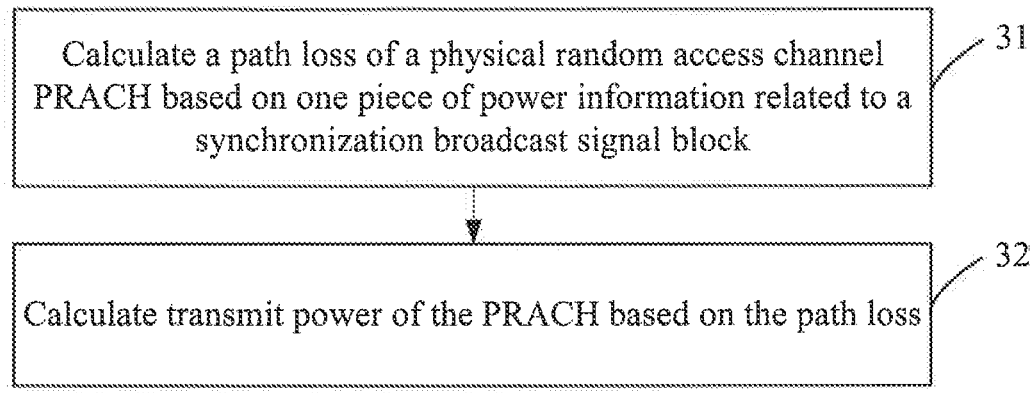
FIG. 3 presents a schematic flowchart of a power control method for a PRACH in a scenario 1 according to some embodiments of this disclosure.

As shown in FIG. 3, the method in some embodiments of this disclosure may include the following steps.

Step 31: Calculate a path loss of a physical random access channel PRACH based on one piece of power information related to a synchronization broadcast signal block.

Step 32: Calculate transmit power of the PRACH based on the path loss.

Scenario 2

Figure 4:
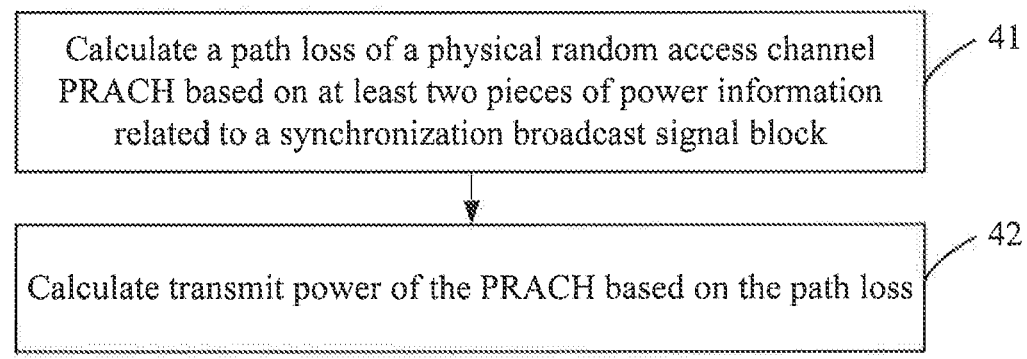
FIG. 4 presents a schematic flowchart of a power control method for a PRACH in a scenario 2 according to some embodiments of this disclosure.

As shown in FIG. 4, the method in some embodiments of this disclosure may include the following steps.

Step 41: Calculate a path loss of a physical random access channel PRACH based on at least two pieces of power information related to a synchronization broadcast signal block.

Step 42: Calculate transmit power of the PRACH based on the path loss.

It should be noted that the scenario 1 may be implemented by using but being not limited to the manner 1 or the manner 2, and the scenario 2 may be implemented by using but being not limited to at least one of the manner 1 or the manner 2.

The foregoing describes a specific implementation of the manner 1. The following further describes different application scenarios using the manner 1 in this embodiment. In a scenario in which the PRACH is non-contention based or contention-based, in a case in which the PRACH corresponds to at least one synchronization broadcast signal block (a correspondence between the PRACH and the synchronization broadcast signal block is configured by the network device; and for example, the network device configures an identifier ID or index of the synchronization broadcast signal block corresponding to the PRACH), or in a case in which the PRACH corresponds to at least one CSI-RS (a correspondence between the PRACH and the CSI-RS is configured by the network device; and for example, the network device configures an identifier ID or index number index of the CSI-RS corresponding to the PRACH) and a target CSI-RS exists in the at least one CSI-RS, the manner 1 may be used to calculate the path loss of the PRACH. To be specific, in a case in which the PRACH corresponds to at least one synchronization broadcast signal block, or in a case in which the PRACH corresponds to at least one CSI-RS and a target CSI-RS exists in the at least one CSI-RS, the path loss is calculated based on transmit power of the synchronization broadcast signal block. The target CSI-RS and the synchronization broadcast signal block are in quasi co-location (quasi Co-location, QCL). It should be noted that the quasi co-location herein includes at least spatial quasi co-location, such as QCL type D (QCL Type D). In addition, a quasi co-location relationship between the CSI-RS and the synchronization broadcast signal block is configured by the network device.

In the scenario 1, if the PRACH corresponds to at least one synchronization broadcast signal block, the terminal selects one from the at least one synchronization broadcast signal block, and calculates the path loss of the PRACH based on transmit power of the selected synchronization broadcast signal block. If the PRACH corresponds to at least one CSI-RS or target CSI-RSs exist in the at least one CSI-RS, the terminal selects one from the target CSI-RSs, and calculates the path loss of the PRACH based on transmit power of a synchronization broadcast signal block quasi co-located with the selected target CSI-RS. The selection herein may be random selection, or may be selection based on a preset rule, for example, selecting the earliest.

In the scenario 2, in a case in which the PRACH corresponds to at least one synchronization broadcast signal block, at least one first candidate path loss is calculated separately based on transmit power of the at least one synchronization broadcast signal block; and an average value, a maximum value, or a minimum value of the at least one first candidate path loss is determined as the path loss. For example, the PRACH corresponds to five SS/PBCH blocks. In this case, the terminal obtains five candidate path losses through calculation separately based on transmit power of the five SS/PBCH blocks, and determines an average value, a maximum value, or a minimum value of the five candidate path losses as the path loss. In addition, in a case in which the PRACH corresponds to at least one CSI-RS and a target CSI-RS exists in the at least one CSI-RS, at least one second candidate path loss is calculated separately based on transmit power of a synchronization broadcast signal block quasi co-located with the target CSI-RS; and an average value, a maximum value, or a minimum value of the at least one second candidate path loss is determined as the path loss. For example, the PRACH corresponds to five CSI-RSs, where three target CSI-RSs exist in the five CSI-RSs, that is, three CSI-RSs spatially quasi co-located with an SS/PBCH block exist. In this case, the terminal obtains three candidate path losses through calculation separately based on transmit power of the SS/PBCH block quasi co-located with the three target CSI-RSs, and determines an average value, a maximum value, or a minimum value of the three candidate path losses as the path loss.

The foregoing describes the case of calculating the path loss in different scenarios using only the manner 1. The following further describes different application scenarios using only the manner 2 in this embodiment. In a case in which the PRACH corresponds to at least one CSI-RS (a correspondence between the PRACH and the CRI-RS is configured by the network device; and for example, the network device configures an identifier ID or index number index of the CRI-RS corresponding to the PRACH), or in a case in which the PRACH corresponds to at least one synchronization broadcast signal block (a correspondence between the PRACH and the synchronization broadcast signal block is configured by the network device; and for example, the network device configures an identifier ID or index number index of the synchronization broadcast signal block corresponding to the PRACH) and a target synchronization broadcast signal block exists in the at least one synchronization broadcast signal block, the manner 2 is used to calculate the path loss. To be specific, in a case in which the PRACH corresponds to at least one CSI-RS, or in a case in which the PRACH corresponds to at least one synchronization broadcast signal block and a target synchronization broadcast signal block exists in the at least one synchronization broadcast signal block, the path loss is calculated based on transmit power of the synchronization broadcast signal block and a power offset between the CSI-RS and the synchronization broadcast signal block, where the target synchronization broadcast signal block and the CSI-RS are quasi co-located. It should be noted that the quasi co-location herein also includes at least spatial quasi co-location, such as QCL type D (QCL Type D). In addition, a quasi co-location relationship between the CSI-RS and the synchronization broadcast signal block is configured by the network device.

In the scenario 1, if the PRACH corresponds to at least one CSI-RS, the terminal selects one from the at least one CSI-RS, and calculates the path loss of the PRACH based on transmit power of the synchronization broadcast signal block and a power offset between the selected CSI-RS and the synchronization broadcast signal block (such as an SS/PBCH block). If the PRACH corresponds to at least one synchronization broadcast signal block, and target synchronization broadcast signal blocks exist in the at least one synchronization broadcast signal block, the terminal selects one from the target synchronization broadcast signal blocks, and calculates the path loss of the PRACH based on transmit power of the selected target synchronization broadcast signal block and a power offset between the CSI-RS and the selected target synchronization broadcast signal block.

In the scenario 2, in a case in which the PRACH corresponds to at least one CSI-RS, at least one third candidate path loss is calculated separately based on at least one power offset between the at least one CSI-RS and the synchronization broadcast signal block and transmit power of the synchronization broadcast signal block; and an average value, a maximum value, or a minimum value of the at least one third candidate path loss is determined as the path loss. For example, the PRACH corresponds to five CSI-RSs. In this case, the terminal obtains five candidate path losses through calculation separately based on power offsets between the five CSI-RSs and an SS/PBCH block and transmit power of the SS/PBCH block, and determines an average value, a maximum value, or a minimum value of the five candidate path losses as the path loss. In addition, in a case in which the PRACH corresponds to at least one synchronization broadcast signal block and a target synchronization broadcast signal block exists in the at least one synchronization broadcast signal block, at least one fourth candidate path loss is calculated separately based on transmit power of the target synchronization broadcast signal block and a power offset between the CSI-RS and the target synchronization broadcast signal block; and an average value, a maximum value, or a minimum value of the at least one fourth candidate path loss is determined as the path loss. For example, the PRACH corresponds to five SS/PBCH blocks, where three target SS/PBCH blocks exist in the five SS/PBCH blocks, that is, three SS/PBCH blocks spatially quasi co-located with the CSI-RS exist. In this case, the terminal obtains three candidate path losses separately based on power offsets between the CSI-RS and the three target SS/PBCH blocks and transmit power of the three target SS/PBCH blocks, and determines an average value, a maximum value, or a minimum value of the three candidate path losses as the path loss.

The foregoing describes the embodiment implemented by using only the manner 1 or only the manner 2 in the scenario 2. The following further describes examples of calculating the path loss by using a combination of the manner 1 and the manner 2 in the scenario 2 in some embodiments of this disclosure.

Example 1: In a case in which the PRACH corresponds to at least one CSI-RS and a target CSI-RS (a quantity of the target CSI-RSs is less than a total quantity of the at least one CSI-RS) exists in the at least one CSI-RS, a fifth candidate path loss is calculated separately based on transmit power of the synchronization broadcast signal block quasi co-located with the target CSI-RS; a sixth candidate path loss is calculated separately based on transmit power of the synchronization broadcast signal block and a power offset between another CSI-RS than the target CSI-RS in the at least one CSI-RS and the synchronization broadcast signal block; and an average value, a maximum value, or a minimum value of the fifth candidate path loss and the sixth candidate path loss is determined as the path loss. For example, the PRACH corresponds to five CSI-RSs, where three target CSI-RSs exist in the five CSI-RSs, that is, three CSI-RSs spatially quasi co-located with an SS/PBCH block exist. In this case, the terminal obtains three fifth candidate path losses separately based on transmit power of the SS/PBCH block quasi co-located with the three target CSI-RSs. Further, the terminal further obtains two sixth candidate path losses through calculation separately based on power offsets between the other two CSI-RSs and the SS/PBCH block and the transmit power of the SS/PBCH block. The terminal determines an average value, a maximum value, or a minimum value of the three fifth candidate path losses and the two sixth candidate path losses as the path loss.

Example 2: In a case in which the PRACH corresponds to at least one synchronization broadcast signal block and a target synchronization broadcast signal block (a quantity of the target synchronization broadcast signal blocks is less than a total quantity of the at least one synchronization broadcast signal block) exists in the at least one synchronization broadcast signal block, a seventh candidate path loss is calculated separately based on transmit power of the target synchronization broadcast signal block and a power offset between the CSI-RS and the target synchronization broadcast signal block; an eighth candidate path loss is calculated separately based on transmit power of another synchronization broadcast signal block than the target synchronization broadcast signal block in the at least one synchronization broadcast signal block; and an average value, a maximum value, or a minimum value of the seventh candidate path loss and the eighth candidate path loss is determined as the path loss. For example, the PRACH corresponds to five SS/PBCH blocks, where three target SS/PBCH blocks exist in the five SS/PBCH blocks, that is, three SS/PBCH blocks spatially quasi co-located with the CSI-RS exist. In this case, the terminal obtains three seventh candidate path losses separately based on power offsets between the CSI-RS and the three target SS/PBCH blocks and transmit power of the three target SS/PBCH blocks, and obtains two eighth candidate path losses through calculation based on transmit power of the other two SS/PBCH blocks. The terminal further determines an average value, a maximum value, or a minimum value of the three seventh candidate path losses and the two eighth candidate path losses as the path loss.

Example 3: In a case in which the PRACH corresponds to at least one synchronization broadcast signal block and at least one CSI-RS (regardless of whether there are a target synchronization broadcast signal block and a target CSI-RS that are quasi co-located), a ninth candidate path loss is calculated separately based on transmit power of the at least one synchronization broadcast signal block; a tenth candidate path loss is calculated separately based on at least one power offset between the at least one CSI-RS and the synchronization broadcast signal block and transmit power of the synchronization broadcast signal block; and an average value, a maximum value, or a minimum value of the ninth candidate path loss and the tenth candidate path loss is determined as the path loss. For example, the PRACH corresponds to five SS/PBCH blocks and five CSI-RSs. In this case, the terminal obtains five ninth candidate path losses through calculation separately based on transmit power of the five SS/PBCH blocks, and obtains five tenth candidate path losses through calculation separately based on power offsets between the five CSI-RSs and an SS/PBCH block and transmit power of the SS/PBCH block. The terminal determines an average value, a maximum value, or a minimum value of the five ninth candidate path losses and the five tenth candidate path losses as the path loss.

Example 4: In a case in which the PRACH corresponds to at least one synchronization broadcast signal block and at least one CSI-RS and a target synchronization broadcast signal block (a quantity of the target synchronization broadcast signal blocks is less than a total quantity of the at least one synchronization broadcast signal block) or a target CSI-RS (a quantity of the target CSI-RS s is less than a total quantity of the at least one CSI-RSs) exists, the following manners may be used for implementation, but this is not limited.

a. Calculate an eleventh candidate path loss separately based on transmit power of the synchronization broadcast signal block; calculate a twelfth candidate path loss based on transmit power of the synchronization broadcast signal block and a power offset between another CSI-RS than the target CSI-RS in the at least one CSI-RS and the synchronization broadcast signal block; and determine an average value, a maximum value, or a minimum value of the eleventh candidate path loss and the twelfth candidate path loss as the path loss. For example, the PRACH corresponds to five SS/PBCH blocks and five CSI-RSs, where three pairs of target SS/PBCH blocks and target CSI-RSs that are quasi co-located exist in the five SS/PBCH blocks and the five CSI-RSs. In this case, the terminal obtains five eleventh candidate path losses through calculation separately based on transmit power of the five SS/PBCH blocks, and obtains two twelfth candidate path losses through calculation separately based on power offsets between two CSI-RSs other than the three target CSI-RSs in the five CSI-RSs and an SS/PBCH block and transmit power of the SS/PBCH block. The terminal determines an average value, a maximum value, or a minimum value of the five eleventh candidate path losses and the two twelfth candidate path losses as the path loss.

b. Calculate a thirteenth candidate path loss separately based on transmit power of the synchronization broadcast signal block and a power offset between the at least one CSI-RS and the synchronization broadcast signal block; calculate a fourteenth candidate path loss based on transmit power of the target synchronization broadcast signal block; and determine an average value, a maximum value, or a minimum value of the thirteenth candidate path loss and the fourteenth candidate path loss as the path loss. For example, the PRACH corresponds to five SS/PBCH blocks and five CSI-RSs, where three pairs of target SS/PBCH blocks and target CSI-RSs that are quasi co-located exist in the five SS/PBCH blocks and the five CSI-RSs. In this case, the terminal obtains five thirteenth candidate path losses through calculation separately based on power offsets between the five CSI-RSs and SS/PBCH blocks and transmit power of the five SS/PBCH blocks, and obtains two fourteenth candidate path losses through calculation separately based on transmit power of two SS/PBCH blocks other than the three target SS/PBCH blocks in the five SS/PBCH blocks. The terminal determines an average value, a maximum value, or a minimum value of the five thirteenth candidate path losses and the two fourteenth candidate path losses as the path loss.

The foregoing describes different manners of calculating transmit power of the PRACH in some embodiments of this disclosure and different application scenarios to which different calculation manners are applicable. In addition, all the foregoing embodiments may be applicable to different communication service procedures, for example, an initial access procedure, a link recovery procedure, a handover procedure, and a beam management procedure. To be specific, the PRACH is used for one of the following procedures: the initial access procedure, the link recovery procedure, the handover procedure, the beam management procedure, and the like. In an optional embodiment, for the foregoing communication service procedure, before step 21, one of the following is further included:

obtaining a PRACH resource used for access in the initial access procedure, where the PRACH resource used for access is configured by the network device or predefined;

obtaining a PRACH resource used for link recovery in the link recovery procedure, where the PRACH resource used for link recovery is configured by the network device or predefined;

obtaining a PRACH resource used for handover in the handover procedure, where the PRACH resource used for handover is configured by the network device or predefined; and obtaining a PRACH resource used for beam management in the beam management process, where the PRACH resource used for beam management is configured by the network device or predefined.

In the power control method for a PRACH in some embodiments of this disclosure, the terminal calculates the path loss of the PRACH based on the power information related to the synchronization broadcast signal block (such as the SS/PBCH block), and therefore determines the transmit power of the PRACH. Because the synchronization broadcast signal block may be received in different scenarios, the path loss in different scenarios can be calculated in this manner, and the transmit power of the PRACH can be accurately calculated. This can ensure normal transmission of the PRACH and improve transmission performance.

The power control method for a physical random access channel in different scenarios is described in the foregoing embodiments. With reference to an accompanying drawing, the following further describes a terminal corresponding to the method.

Figure 5:
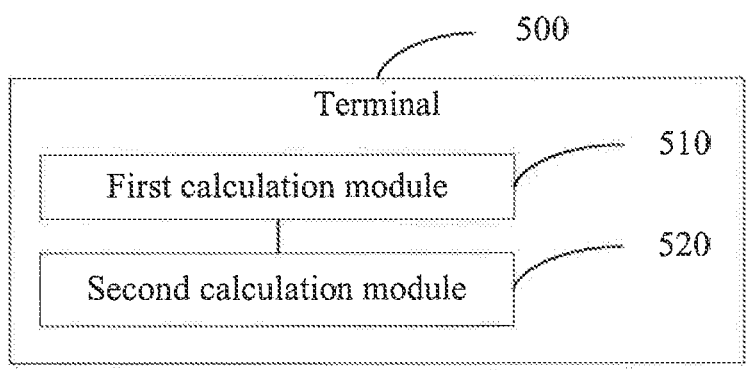
FIG. 5 presents a schematic modular structural diagram of a terminal according to some embodiments of this disclosure.

As shown in FIG. 5, a terminal 500 in some embodiments of this disclosure can implement details of the method in the foregoing embodiment, that is, calculating a path loss of a physical random access channel PRACH based on power information related to a synchronization broadcast signal block, and calculating transmit power of the PRACH based on the path loss, and a same effect can be achieved. The terminal 500 specifically includes the following functional modules:

a first calculation module 510, configured to calculate a path loss of a physical random access channel PRACH based on power information related to a synchronization broadcast signal block; and a second calculation module 520, configured to calculate transmit power of the PRACH based on the path loss.

If the PRACH is non-contention based, the first calculation module 510 includes at least one of the following:

a first calculation submodule, configured to calculate the path loss of the PRACH based on transmit power of the synchronization broadcast signal block, where the transmit power of the synchronization broadcast signal block is configured by a network device; or a second calculation submodule, configured to calculate the path loss of the PRACH based on transmit power of the synchronization broadcast signal block and a power offset between a channel state information reference signal CSI-RS and the synchronization broadcast signal block, where the power offset is configured by a network device.

If the PRACH is contention-based, the first calculation module further includes:

a third calculation submodule, configured to calculate the path loss of the PRACH based on transmit power of the synchronization broadcast signal block.

The first calculation submodule or the third calculation submodule is specifically configured to:

in a case in which the PRACH corresponds to at least one synchronization broadcast signal block, or in a case in which the PRACH corresponds to at least one CSI-RS and a target CSI-RS exists in the at least one CSI-RS, calculate the path loss based on transmit power of the synchronization broadcast signal block, where the target CSI-RS and the synchronization broadcast signal block are quasi co-located.

Specifically, the first calculation submodule or the third calculation submodule is specifically configured to:

in the case in which the PRACH corresponds to the at least one synchronization broadcast signal block, calculate at least one first candidate path loss separately based on transmit power of the at least one synchronization broadcast signal block; and determine an average value, a maximum value, or a minimum value of the at least one first candidate path loss as the path loss.

Specifically, the first calculation submodule or the third calculation submodule is specifically configured to:

in the case in which the PRACH corresponds to the at least one CSI-RS and the target CSI-RS exists in the at least one CSI-RS, calculate at least one second candidate path loss separately based on transmit power of the synchronization broadcast signal block quasi co-located with the target CSI-RS; and determine an average value, a maximum value, or a minimum value of the at least one second candidate path loss as the path loss.

The first calculation submodule or the third calculation submodule is specifically configured to:

determine a difference between transmit power of the synchronization broadcast signal block and higher layer filtered reference signal received power as the path loss, where the reference signal received power is actual received power of the synchronization broadcast signal block.

The second calculation submodule is specifically configured to:

in a case in which the PRACH corresponds to at least one CSI-RS, or in a case in which the PRACH corresponds to at least one synchronization broadcast signal block and a target synchronization broadcast signal block exists in the at least one synchronization broadcast signal block, calculate the path loss based on transmit power of the synchronization broadcast signal block and a power offset between the CSI-RS and the synchronization broadcast signal block, where the target synchronization broadcast signal block and the CSI-RS are quasi co-located.

Specifically, the second calculation submodule is specifically configured to:

in the case in which the PRACH corresponds to the at least one CSI-RS, calculate at least one third candidate path loss separately based on transmit power of the synchronization broadcast signal block and at least one power offset between the at least one CSI-RS and the synchronization broadcast signal block; and determine an average value, a maximum value, or a minimum value of the at least one third candidate path loss as the path loss.

Specifically, the second calculation submodule is specifically configured to:

in the case in which the PRACH corresponds to the at least one synchronization broadcast signal block and the target synchronization broadcast signal block exists in the at least one synchronization broadcast signal block, calculate at least one fourth candidate path loss separately based on transmit power of the target synchronization broadcast signal block and a power offset between the CSI-RS and the target synchronization broadcast signal block; and determine an average value, a maximum value, or a minimum value of the at least one fourth candidate path loss as the path loss.

The second calculation submodule is specifically configured to:

determine a sum of the transmit power of the synchronization broadcast signal block and the power offset as reference signal transmit power, or determine a difference between the transmit power of the synchronization broadcast signal block and the power offset as reference signal transmit power; and determine a difference between the reference signal transmit power and higher layer filtered reference signal received power as the path loss.

The synchronization broadcast signal block includes at least one of a synchronization signal and a physical broadcast channel, and the synchronization signal includes at least one of a primary synchronization signal and a secondary synchronization signal.

The PRACH is used for one of the following procedures:
an initial access procedure;
a link recovery procedure;
a handover procedure; and
a beam management procedure.

It should be noted that the terminal in some embodiments of this disclosure calculates the path loss of the PRACH based on the power information related to the synchronization broadcast signal block (such as the SS/PBCH block), and therefore determines the transmit power of the PRACH. Because the synchronization broadcast signal block may be received in different scenarios, the path loss in different scenarios can be calculated in this manner, and the transmit power of the PRACH can be accurately calculated. This can ensure normal transmission of the PRACH and improve transmission performance.

It should be noted that it should be understood that division of modules of the terminal is merely logical function division. The modules may be all or partially integrated in a physical entity or may be separated physically in an actual implementation. In addition, the modules may be all implemented in a form of software called by a processing component, or may be all implemented in a form of hardware; or a part of modules may be implemented in a form of software called by a processing component, and another part of modules may be implemented in a form of hardware. For example, a determining module may be a processing component that is separately disposed, or may be integrated in a chip of the apparatus for implementation. In addition, the determining module may be stored in the memory of the apparatus in a form of program code, and is called by a processing component of the apparatus to perform a function of the determining module. Implementation of other modules is similar to this. In addition, the modules may be all or partially integrated, or may be implemented independently. Herein, the processing component may be an integrated circuit, and has a signal processing capability. In an implementation process, the steps in the foregoing method or the foregoing modules can be implemented by using a hardware integrated logic circuit in the processing component, or by using instructions in a form of software.

For example, the modules may be configured as one or more integrated circuits for implementing the foregoing method, for example, one or more application-specific integrated circuits (Application-Specific Integrated Circuit, ASIC), or one or more microprocessors (eg. digital signal processor, DSP), or one or more field programmable gate arrays (Field Programmable Gate Array, FPGA). For another example, when one of the foregoing modules is implemented in a form of program code called by the processing component, the processing component may be a general processor, for example, a central processing unit (Central Processing Unit, CPU) or another processor that may call program code. For another example, the modules may be integrated and implemented in a form of a system-on-a-chip (system-on-a-chip, SOC).

Figure 6:
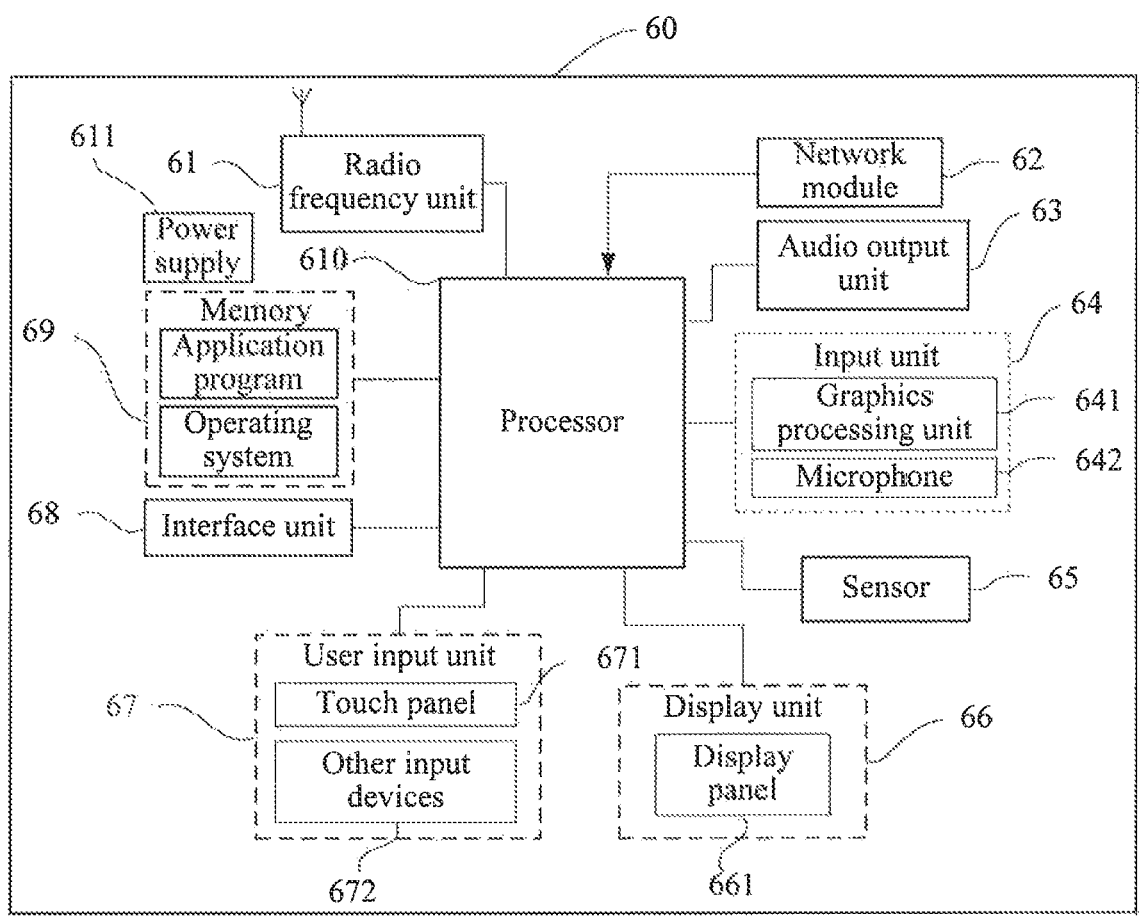
FIG. 6 presents a block diagram of a terminal according to some embodiments of this disclosure.

To better achieve the foregoing objective, further, FIG. 6 is a schematic diagram of a hardware structure of a terminal for implementing each embodiment of this disclosure. The terminal 60 includes but is not limited to components such as a radio frequency unit 61, a network module 62, an audio output unit 63, an input unit 64, a sensor 65, a display unit 66, a user input unit 67, an interface unit 68, a memory 69, a processor 610, and a power supply 611. A person skilled in the art may understand that the structure of the terminal shown in FIG. 6 does not constitute a limitation on the terminal. A quantity of components included in the terminal may be greater or less than that shown in the figure, or some components are combined, or component arrangements are different. In some embodiments of this disclosure, the terminal includes but is not limited to a mobile phone, a tablet computer, a laptop computer, a palmtop computer, an in-vehicle terminal, a wearable device, a pedometer, and the like.

The radio frequency unit 61 is configured to receive and transmit data under control of the processor 610.

The processor 610 is configured to calculate a path loss of a physical random access channel PRACH based on power information related to a synchronization broadcast signal block; and calculate transmit power of the PRACH based on the path loss.

The terminal in some embodiments of this disclosure calculates the path loss of the PRACH based on the power information related to the synchronization broadcast signal block (such as the SS/PBCH block), and therefore determines the transmit power of the PRACH. Because the synchronization broadcast signal block may be received in different scenarios, the path loss in different scenarios can be calculated in this manner, and the transmit power of the PRACH can be accurately calculated. This can ensure normal transmission of the PRACH and improve transmission performance.

It should be understood that in some embodiments of this disclosure, the radio frequency unit 61 may be configured to: receive and send signals in an information receiving/sending process or a call process; and specifically, after receiving downlink data from a base station, send the downlink data to the processor 610 for processing, and in addition, send uplink data to the base station. Generally, the radio frequency unit 61 includes but is not limited to an antenna, at least one amplifier, a transceiver, a coupler, a low noise amplifier, a duplexer, and the like. In addition, the radio frequency unit 61 may further communicate with a network and another device through a wireless communications system.

The terminal provides wireless broadband Internet access for a user by using the network module 62, for example, helps the user send and receive e-mails, browse web pages, and access streaming media.

The audio output unit 63 may convert audio data received by the radio frequency unit 61 or the network module 62 or stored in the memory 69 into an audio signal, and output the audio signal as a sound. In addition, the audio output unit 63 may further provide an audio output (for example, a call signal reception sound or a message reception sound) related to a specific function performed by the terminal 60. The audio output unit 63 includes a speaker, a buzzer, a telephone receiver, and the like.

The input unit 64 is configured to receive an audio or video signal. The input unit 64 may include a graphics processing unit (Graphics Processing Unit, GPU) 641 and a microphone 642. The graphics processing unit 641 processes image data of a still picture or a video obtained by an image capture apparatus (for example, a camera) in an image capture mode or a video capture mode. A processed image frame may be displayed on the display unit 66. An image frame processed by the graphics processing unit 641 may be stored in the memory 69 (or another storage medium) or sent by the radio frequency unit 61 or the network module 62. The microphone 642 can receive a sound and can process the sound into audio data. The processed audio data can be converted into a format that can be sent to a mobile communication base station through the radio frequency unit 61 in a telephone call mode, for outputting.

The terminal 60 further includes at least one sensor 65, for example, an optical sensor, a motion sensor, and another sensor. Specifically, the optical sensor includes an ambient light sensor and a proximity sensor. The ambient light sensor may adjust luminance of a display panel 661 based on brightness of ambient light. The proximity sensor may turn off the display panel 661 and/or backlight when the terminal 60 moves to an ear. As a type of motion sensor, an accelerometer sensor can detect magnitudes of accelerations in all directions (usually three axes), can detect a magnitude and a direction of gravity when the mobile phone is in a stationary state, and can be applied to terminal posture recognition (such as screen switching between portrait and landscape, related games, and magnetometer posture calibration), functions related to vibration recognition (such as pedometer and tapping), and the like. The sensor 65 may further include a fingerprint sensor, a pressure sensor, an iris sensor, a molecular sensor, a gyroscope, a barometer, a hygrometer, a thermometer, an infrared sensor, and the like. Details are not described herein.

The display unit 66 is configured to display information input by the user or information provided for the user. The display unit 66 may include the display panel 661. The display panel 661 may be configured in a form of a liquid crystal display (Liquid Crystal Display, LCD), an organic light-emitting diode (Organic Light-Emitting Diode, OLED), or the like.

The user input unit 67 may be configured to receive input digit or character information, and generate a key signal input related to a user setting and function control of the terminal. Specifically, the user input unit 67 includes a touch panel 671 and other input devices 672. The touch panel 671, also referred to as a touchscreen, may capture a touch operation performed by the user on or near the touch panel (for example, an operation performed by the user on the touch panel 671 or near the touch panel 671 by using any appropriate object or accessory such as a finger or a stylus). The touch panel 671 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, sends the point coordinates to the processor 610, and receives and executes a command sent by the processor 610. In addition, the touch panel 671 may be implemented in a plurality of forms, for example, a resistive, capacitive, infrared, or surface acoustic wave touch panel. The user input unit 67 may further include the other input devices 672 in addition to the touch panel 671. Specifically, the other input devices 672 may include but are not limited to a physical keyboard, a function key (such as a volume control key or a power on/off key), a trackball, a mouse, a joystick, and the like. Details are not described herein.

Further, the touch panel 671 may cover the display panel 661. After the touch panel 671 detects a touch operation on or near the touch panel, the touch panel 671 transmits the touch operation to the processor 610 to determine a type of a touch event. Then the processor 610 provides a corresponding visual output on the display panel 661 based on the type of the touch event. Although the touch panel 671 and the display panel 661 are used as two independent components to implement input and output functions of the terminal in FIG. 6, the touch panel 671 and the display panel 661 may be integrated to implement the input and output functions of the terminal in some embodiments. This is not specifically limited herein.

The interface unit 68 is an interface for connecting an external apparatus to the terminal 60. For example, the external apparatus may include a wired or wireless headphone port, an external power (or battery charger) port, a wired or wireless data port, a memory card port, a port for connecting an apparatus having an identification module, an audio input/output (I/O) port, a video I/O port, an earphone port, and the like. The interface unit 68 may be configured to receive an input (for example, data information or power) from an external apparatus, and transmit the received input to one or more components in the terminal 60, or may be configured to transmit data between the terminal 60 and an external apparatus.

The memory 69 may be configured to store a software program and various data. The memory 69 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 69 may include a high-speed random access memory, or may further include a non-volatile memory, for example, at least one magnetic disk storage device or a flash memory, or another volatile solid-state storage device.

The processor 610 is a control center of the terminal. The processor 610 uses various interfaces and lines to connect all parts of the entire terminal, and performs various functions and data processing of the terminal by running or executing the software program and/or module stored in the memory 69 and invoking data stored in the memory 69, thereby performing overall monitoring on the terminal. The processor 610 may include one or more processing units. Optionally, the processor 610 may integrate an application processor and a modem processor. The application processor mainly processes the operating system, a user interface, an application program, and the like. The modem processor mainly processes wireless communication. It may be understood that the modem processor may alternatively not be integrated into the processor 610.

The terminal 60 may further include the power supply 611 (for example, a battery) supplying power to all components. Optionally, the power supply 611 may be logically connected to the processor 610 through a power management system. In this way, functions such as charge management, discharge management, and power consumption management are implemented by using the power management system.

In addition, the terminal 60 includes some functional modules that are not illustrated. Details are not described herein.

Optionally, some embodiments of this disclosure further provide a terminal, including: a processor 610, a memory 69, and a computer program stored in the memory 69 and capable of running on the processor 610. When the computer program is executed by the processor 610, processes in the foregoing embodiments of the power control method for a physical random access channel are implemented, with the same technical effects achieved. To avoid repetition, details are not described again herein. The terminal may be a wireless terminal or a wired terminal. The wireless terminal may be a device that provides a user with voice and/or other service data connectivity, a handheld device with a wireless connection function, or another processing device connected to a wireless modem. The wireless terminal may communicate with one or more core networks through a radio access network (Radio Access Network, RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (Personal Communication Service, PCS) phone, a cordless telephone set, a Session Initiation Protocol (Session Initiation Protocol, SIP) phone, a wireless local loop (Wireless Local Loop, WLL) station, or a personal digital assistant (Personal Digital Assistant, PDA). The wireless terminal may also be referred to as a system, a subscriber unit (Subscriber Unit), a subscriber station (Subscriber Station), a mobile station (Mobile Station), a mobile (Mobile), a remote station (Remote Station), a remote terminal (Remote Terminal), an access terminal (Access Terminal), a user terminal (User Terminal), a user agent (User Agent), or a user device (User Device or User Equipment). This is not limited herein.

Some embodiments of this disclosure further provide a computer-readable storage medium, where a computer program is stored in the computer-readable storage medium.

When the computer program is executed by a processor, processes of the foregoing embodiments of the power control method for a physical random access channel are implemented, with the same technical effects achieved. To avoid repetition, details are not described again herein. The computer-readable storage medium is, for example, a read-only memory (Read-Only Memory, ROM), a random access memory (Random Access Memory, RAM), a magnetic disk, or an optical disc.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the prior art, or some of the technical solutions may be embodied in a form of a computer software product. The computer software product is stored in a storage medium, and includes several instructions for instructing a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a ROM, a RAM, a magnetic disk, or an optical disc.

In addition, it should be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence, and some steps may be performed in parallel or independently. A person of ordinary skill in the art can understand that all or any steps or components of the method and apparatus in this disclosure may be implemented by hardware, firmware, software, or a combination thereof in any computing apparatus (including a processor, a storage medium, and the like) or a network of computing apparatuses. This can be implemented as long as a person of ordinary skill in the art applies basic programming skill after reading the specification of this disclosure.

Therefore, an objective of this disclosure may also be achieved by running a program or a group of programs on any computing apparatus. The computing apparatus may be a well-known general apparatus. Therefore, the objective of this disclosure may also be achieved by merely providing a program product including program code for implementing the method or apparatus. To be specific, the program product also constitutes this disclosure, and a storage medium storing the program product also constitutes this disclosure. Apparently, the storage medium may be any well-known storage medium or any storage medium that will be developed in the future. It should also be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence. Some steps may be performed in parallel or independently.

The foregoing descriptions are merely optional implementations of this disclosure. It should be noted that a person of ordinary skill in the art may make several improvements or polishing without departing from the principle of this disclosure and the improvements and polishing shall fall within the protection scope of this disclosure.

What is claimed is:

1. A power control method for a physical random access channel, applied to a terminal and comprising:
   calculating a path loss of a physical random access channel (PRACH) based on power information related to a synchronization broadcast signal block; and
   calculating transmit power of the PRACH based on the path loss;
   wherein the step of calculating a path loss of a physical random access channel PRACH based on power information related to a synchronization broadcast signal block comprises;
   calculating the path loss of the PRACH based on transmit power of the synchronization broadcast signal block and a power offset between a channel state information reference signal (CSI-RS) and the synchronization broadcast signal block, wherein the power offset is configured by a network device.

2. The power control method for a physical random access channel according to claim 1, wherein the step of calculating the path loss of the PRACH based on transmit power of the synchronization broadcast signal block and a power offset between a channel state information reference signal CSI-RS and the synchronization broadcast signal block comprises:

in a case in which the PRACH corresponds to at least one CSI-RS, or in a case in which the PRACH corresponds to at least one synchronization broadcast signal block and a target synchronization broadcast signal block exists in the at least one synchronization broadcast signal block, calculating the path loss based on transmit power of the synchronization broadcast signal block and a power offset between the CSI-RS and the synchronization broadcast signal block.

3. The power control method for a physical random access channel according to claim 2, wherein the step of calculating the path loss based on transmit power of the synchronization broadcast signal block and a power offset between the CSI-RS and the synchronization broadcast signal block comprises:

in the case in which the PRACH corresponds to the at least one CSI-RS, calculating at least one third candidate path loss separately based on transmit power of the synchronization broadcast signal block and at least one power offset between the at least one CSI-RS and the synchronization broadcast signal block; and determining an average value, a maximum value, or a minimum value of the at least one third candidate path loss as the path loss.

4. The power control method for a physical random access channel according to claim 2, Wherein the step of calculating the path loss based on transmit power of the synchronization broadcast signal block and a power offset between the CSI-RS and the synchronization broadcast signal block comprises:

in the case in which the PRACH corresponds to the at least one synchronization broadcast signal block and the target synchronization broadcast signal block exists in the at least one synchronization broadcast signal block, calculating at least one fourth candidate path loss separately based on transmit power of the target synchronization broadcast signal block and a power offset between the CSI-RS and the target synchronization broadcast signal block; and determining an average value, a maximum value, or a minimum value of the at least one fourth candidate path loss as the path loss.

5. The power control method for a physical random access channel according to claim 1, wherein the step of calculating the path loss of the PRACH based on transmit power of the synchronization broadcast signal block and a power offset between a channel state information reference signal CS I-RS and the synchronization broadcast signal block comprises:

determining a sum of the transmit power of the synchronization broadcast signal block and the power offset as reference signal transmit power, or determining a difference between the transmit power of the synchronization broadcast signal block and the power offset as reference signal transmit power; and determining a difference between the reference signal transmit power and higher layer filtered reference signal received power as the path loss.

6. The power control method for a physical random access channel according to claim 1, wherein the PRACH is used for one of the following procedures:

an initial access procedure;
a link recovery procedure;
a handover procedure; and
a beam management procedure.

7. A terminal, wherein the terminal comprises a processor, a memory, and a computer program stored in the memory and capable of running on the processor, and when the computer program is executed by the processor, steps of a power control method for a physical random access channel are implemented, the method comprising:

calculating a path loss of a physical random access channel (PRACH) based on power information related to a synchronization broadcast signal block; and calculating transmit power of the MACH based on the path loss;

wherein the step of calculating a path lass of a physical random access channel PRACH based on power information related to a synchronization broadcast signal block comprises;

calculating the path loss of the PRACH based on transmit power of the synchronization broadcast signal block and a power offset between a channel state information reference signal (CSI-RS) and the synchronization broadcast signal block, wherein the power offset is configured by a network device.

8. The terminal according to claim 7, wherein the step of calculating the path loss of the PRACH based on transmit power of the synchronization broadcast signal block and a power offset between a channel state information reference signal CSI-RS and the synchronization broadcast signal block comprises:

in a case in which the PRACH corresponds to at least one CSI-RS, or in a case in which the PRACH corresponds to at least one synchronization broadcast signal block and a target synchronization broadcast signal block exists in the at least one synchronization broadcast signal block, calculating the path loss based on transmit power of the synchronization broadcast signal block and a power offset between the CSI-RS and the synchronization broadcast signal block.

9. The terminal according to claim 8, wherein the step of calculating the path loss based on transmit power of the synchronization broadcast signal block and a power offset between the CSI-RS and the synchronization broadcast signal block comprises:

in the case in which the PRACH corresponds to the at least one CSI-RS, calculating at least one third candidate path loss separately based on transmit power of the synchronization broadcast signal block and at least one power offset between the at least one CSI-RS and the synchronization broadcast signal block; and determining an average value, a maximum value, or a minimum value of the at least one third candidate path loss as the path loss.

10. The terminal according to claim 8, wherein the step of calculating the path loss based on transmit power of the synchronization broadcast signal block and a power offset between the CSI-RS and the synchronization broadcast signal block comprises:

in the case in which the PRACH corresponds to the at least one synchronization broadcast signal block and the target synchronization broadcast signal block exists in the at least one synchronization broadcast signal block, calculating at least one fourth candidate path loss separately based on transmit power of the target synchronization broadcast signal block and a power offset between the CSI-RS and the target synchronization broadcast signal block; and determining an average value, a maximum value, or a minimum value of the at least one fourth candidate path loss as the path loss.

11. The terminal according to claim 7, wherein the step of calculating the path loss of the PRACH based on transmit power of the synchronization broadcast signal block and a power offset between a channel state information reference signal CSI-RS and the synchronization broadcast signal block comprises:
determining a sum of the transmit power of the synchronization broadcast signal block and the power offset as reference signal transmit power, or determining a difference between the transmit power of the synchronization broadcast signal block and the power offset as reference signal transmit power; and
determining a difference between the reference signal transmit power and higher layer filtered reference signal received power as the path loss.

12. The terminal according to claim 7, wherein the PRACH is used for one of the following procedures:
an initial access procedure;
a link recovery procedure;
a handover procedure; and
a beam management procedure.

13. A non-transitory computer-readable storage medium, wherein the computer-readable storage medium stores a computer program, and when the computer program is executed by a processor, steps of a power control method for a physical random access channel are implemented, the method comprising:
calculating a path loss of a physical random access channel (PRACH) based on power information related to a synchronization broadcast signal block; and
calculating transmit power of the PRACH based on the path loss;
wherein the step of calculating a path loss of a physical random access channel PRACH based on power information related to a synchronization broadcast signal block comprises;
calculating the path loss of the PRACH based on transmit power of the synchronization broadcast signal block and a power offset between a channel state information reference signal (SCI-RS) and the synchronization broadcast signal block, wherein the power offset is configured by a network device.

14. The non-transitory computer-readable storage medium according to claim 3, wherein the step of calculating the path loss of the PRACH based on transmit power of the synchronization broadcast signal block and a power offset between a channel state information reference signal CSI-RS and the synchronization broadcast signal block comprises:
in a case in which the PRACH corresponds to at least one CSI-RS, or in a case in which the PRACH corresponds to at least one synchronization broadcast signal block and a target synchronization broadcast signal block exists in the at least one synchronization broadcast signal block, calculating the path loss based on transmit power of the synchronization broadcast signal block and a power offset between the CSI-RS and the synchronization broadcast signal block.

15. The non-transitory computer-readable storage medium according to claim 14, wherein the step of calculating the path loss based on transmit power of the synchronization broadcast signal block and a power offset between the CSI-RS and the synchronization broadcast signal block comprises:
in the case in which the PRACH corresponds to the at least one CSI-RS, calculating at least one third candidate path loss separately based on transmit power of the synchronization broadcast signal block and at least one power offset between the at least one CSI-RS and the synchronization broadcast signal block; and
determining an average value, a maximum value, or a minimum value of the at least one third candidate path loss as the path loss.

16. The non-transitory computer-readable storage medium according to claim 14, wherein the step of calculating the path loss based on transmit power of the synchronization broadcast signal block and a power offset between the CSI-RS and the synchronization broadcast signal block comprises:
in the case in which the PRACH corresponds to the at least one synchronization broadcast signal block and the target synchronization broadcast signal block exists in the at least one synchronization broadcast signal block, calculating at least one fourth candidate path loss separately based on transmit power of the target synchronization broadcast signal block and a power offset between the CSI-RS and the target synchronization broadcast signal block; and determining an average value, a maximum value, or a minimum value of the at least one fourth candidate path loss as the path loss.

17. The non-transitory computer-readable storage medium according to claim 13, wherein the step of calculating the path loss of the PRACH based on transmit power of the synchronization broadcast signal block and a power offset between a channel state information reference signal CSI-RS and the synchronization broadcast signal block comprises;
determining a sum of the transmit power of the synchronization broadcast signal block and the power offset as reference signal transmit power, or determining a difference between the transmit power of the synchronization broadcast signal block and the power offset as reference signal transmit power; and
determining a difference between the reference signal transmit power and higher layer filtered reference signal received power as the path loss.

18. The non-transitory computer-readable storage medium according to claim 13, wherein the PRACH is used for one of the following procedures;
an initial access procedure;
a link recovery procedure;
a handover procedure; and
a beam management procedure.

* * * * *